United States Patent
Bugglin

(10) Patent No.: US 9,851,263 B2
(45) Date of Patent: Dec. 26, 2017

(54) PORTABLE HEATING CHAMBER SYSTEM FOR PYROMETRIC PROFICIENCY TESTING

(71) Applicant: Stephen Bugglin, Lebanon, NJ (US)

(72) Inventor: Stephen Bugglin, Lebanon, NJ (US)

( * ) Notice: Subject to any disclaimer, the term of this patent is extended or adjusted under 35 U.S.C. 154(b) by 310 days.

(21) Appl. No.: 14/869,290

(22) Filed: Sep. 29, 2015

(65) Prior Publication Data

US 2017/0089770 A1    Mar. 30, 2017

(51) Int. Cl.
*G01K 15/00* (2006.01)
*G01K 7/00* (2006.01)
*G01K 1/02* (2006.01)

(52) U.S. Cl.
CPC ........... *G01K 15/007* (2013.01); *G01K 1/022* (2013.01); *G01K 7/003* (2013.01)

(58) Field of Classification Search
USPC .......................................... 373/135; 116/216
See application file for complete search history.

(56) References Cited

U.S. PATENT DOCUMENTS

| 5,635,409 | A | * | 6/1997 | Moslehi | B24B 37/013 250/341.4 |
|---|---|---|---|---|---|
| 7,380,982 | B2 | | 6/2008 | Lohokare | |
| 2003/0121370 | A1 | | 7/2003 | Lloyd | |
| 2014/0153606 | A1 | | 6/2014 | Walker et al. | |
| 2016/0054380 | A1 | * | 2/2016 | Walker | G01R 31/025 324/750.03 |

* cited by examiner

*Primary Examiner* — Lisa Caputo
*Assistant Examiner* — Janice M Soto
(74) *Attorney, Agent, or Firm* — Thomas J. Germinario

(57) ABSTRACT

A portable heating chamber system is adapted and configured for use in performing pyrometric proficiency testing. Within an enclosing structure is an array of thermocouples which function as temperature sensors. Heat is generated within the chamber by one or more electric resistive heat sources, and heated air is circulated by one or more electric fans. Outside the enclosing structure are a temperature controller and a data acquisition device, which applies correction factors to the temperature data and determines uncertainties to assess testing proficiency.

4 Claims, 4 Drawing Sheets

PORTABLE HEATING CHAMBER SYSTEM FOR PYROMETRIC PROFICIENCY TESTING

FIELD OF INVENTION

The present invention relates to the field of thermal processing equipment used for heat treatment of materials and pyrometric calibration/testing thereof, and more particularly to equipment and methodology for testing proficiency in performing such calibration/testing.

BACKGROUND OF THE INVENTION

Thermal processing equipment, such as ovens and furnaces, used in the heat treatment of materials are subject to very tight temperature tolerances, especially as applied to aerospace materials. Precise calibration and accurate correction factors are, therefore, critical in this field. Procedures for ascertaining the accuracy and uniformity of furnace temperature controls are established by engineering/technical standards, such as those issued by SAE International. One example of such standards is the SAE Pyrometry Aerospace Material Specification, the current version of which is AMS2750E. The AMS2750E standard addresses, among other things, procedures for conducting a System Accuracy Test (SAT) and a Temperature Uniformity Survey (TUS). The SAT measures the accuracy of a chamber, oven or furnace temperature control system(s) (Controller/Recorder/High Limit Safety, etc., thermocouple extension wire and thermocouple), while the TUS measures temperature variations within a furnace prior to and after temperature stabilization.

Entities which perform pyrometry testing, such as SAT and TUS, may choose to be ISO/IEC 17025 accredited, which provides them with third party validation in assuring the quality of their calibration and testing activities. Such accreditation requires, among other things participation in proficiency testing, interlaboratory comparisons or round robbins in which one or more pyrometric test(s) are performed and deviations between temperature readings and true temperatures are recorded. Requirements for such proficiency testing are established by bodies such as the Laboratory Accreditation Bureau (L-A-B), A2LA, NVLAP, etc.

One of the principal purposes of pyrometric proficiency testing is to demonstrate the ability of each participant to accurately measure temperature and to provide measurements of uncertainty associated with those measurements. This would be problematic when performing system accuracy tests or temperature uniformity surveys unless each participant was able to use the same thermal processing equipment. The present invention addresses this problem by providing a compact, portable heating chamber for pyrometric proficiency testing, which can be readily transported between different laboratory environments and used with different test instrumentation and/or data acquisition devices to determine each participant's ability to make accurate measurements and to qualify those measurements by stating the associated uncertainties of each measurement.

SUMMARY OF THE INVENTION

The present invention is a portable heating chamber system to be used in performing pyrometric proficiency testing, such as an SAT or a TUS. It comprises an enclosing structure, which is preferably cuboidal in shape, approximately 3-4 cubic feet in volume, with access to the interior through a top lid or sliding panel. Preferably, the enclosing structure is fabricated of a lightweight plastic material suited for a temperature range of 75-150° F.

Within the enclosure is an array of temperature sensors, which are preferably thermocouples. Preferably, to be consistent with the TUS requirements of AMS2750, the array consists of nine thermocouples, eight of which are located in the corners of the chamber and one of which is located at the center. A control sensor/thermocouple is also located within the enclosure, preferably near the center or one of the side walls.

Also within the interior of the chamber are one or more heat sources, which preferably generate heat by means of electrical resistance. Also within the chamber interior are one or more air circulating means, preferably fans.

Outside the chamber enclosure is a temperature controller, which electrically communicates, through wired or wireless connections, with the central control thermocouple and the heat sources. Based on temperature readings from the control thermocouple, the temperature controller cycles the heat sources on and off, or varies the electrical current to the heat sources, to main a constant and uniform control temperature within the chamber.

Each TUS proficiency test participant would use their own data acquisition device, having multiple input channels, each of which is in electrical communication with one of the temperature sensor thermocouples through a wired or wireless connection. The data acquisition device receives and records temperature data from each of the test thermocouples at regular intervals for a certain test duration, and it records a high and low temperature reading for each test thermocouple during the test duration. Preferably the test thermocouple temperature readings are recorded at one-minute intervals for a minimum test duration of two hours or in accordance with the instructions of a proficiency test provider.

In addition to recording uncorrected measured temperature, the data acquisition device applies correction factors, obtained from the calibration certification of the test thermocouples and the latest calibration report for each input channel, to calculate and record corrected temperature readings. The corrected temperature readings are compared with the control temperature to determine the overall uniformity of the chamber. The associated uncertainties are then calculated and documented to qualify the temperature uniformity readings (overall chamber tolerance) that were recorded inside the chamber. These results can then be compared with predefined accuracy and uncertainty parameters to assess testing proficiency.

Optionally, an external computer can be used in conjunction with the portable heating chamber system to compile spreadsheets of the recorded and corrected temperatures and to calculate thermocouple/input channel uncertainties.

Each SAT proficiency test participant would use their own test instrument and test thermocouple (which they would wrap around the control thermocouple in the center of the chamber) to compare against the chamber controller, extension wire and thermocouple system. The results of this comparison (after chamber stabilization) and their associated uncertainties are then documented. These results can then be compared with predefined accuracy and uncertainty parameters to assess testing proficiency.

The foregoing summarizes the general design features of the present invention. In the following sections, specific embodiments of the present invention will be described in some detail. These specific embodiments are intended to demonstrate the feasibility of implementing the present invention in accordance with the general design features discussed above. Therefore, the detailed descriptions of these embodiments are offered for illustrative and exemplary purposes only, and they are not intended to limit the scope either of the foregoing summary description or of the claims which follow.

DETAILED DESCRIPTION OF THE PREFERRED EMBODIMENT

Figure 1:
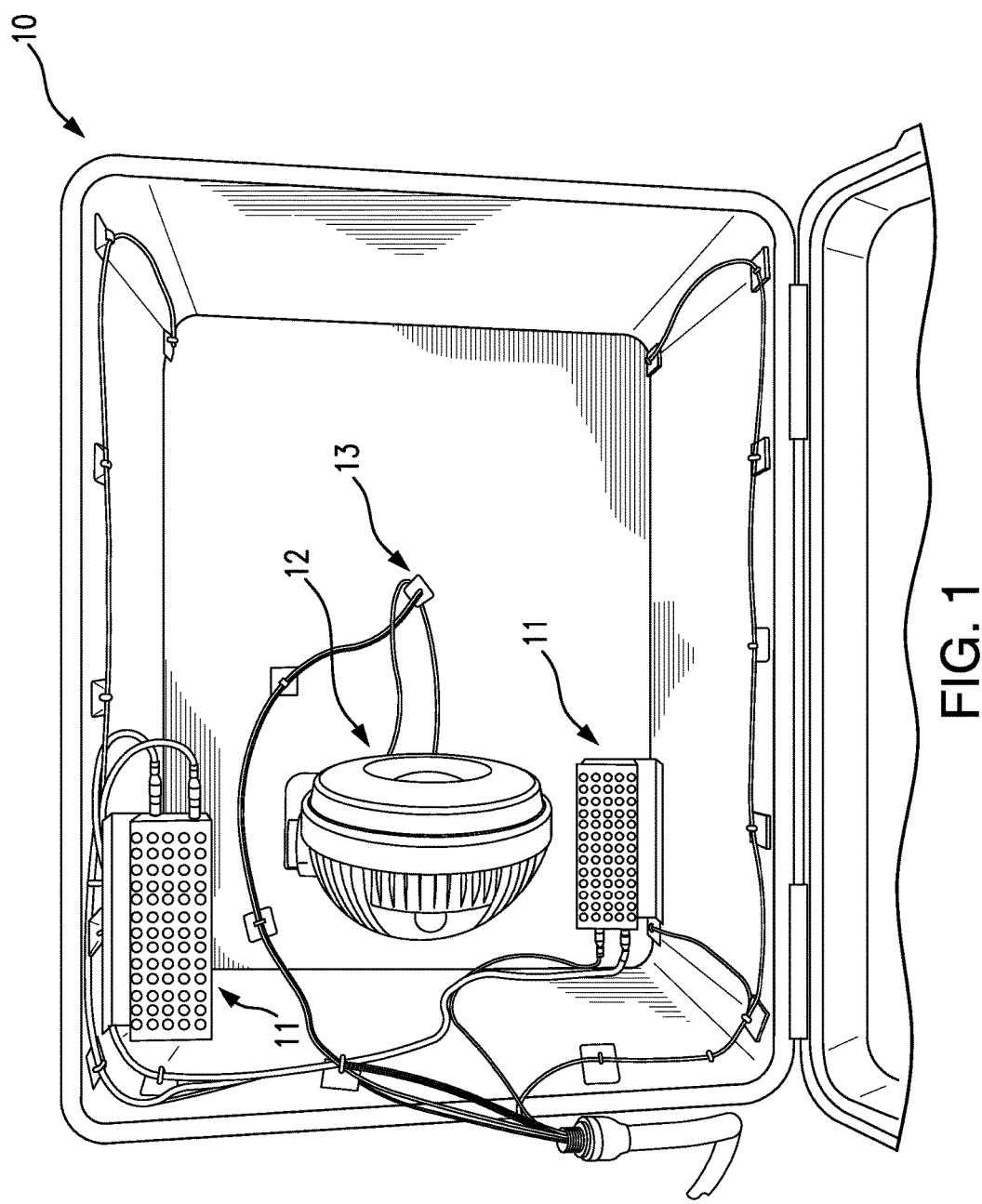
FIG. 1 is a top plan view of the interior of a portable heating chamber system according to one embodiment of the present invention.

Referring to FIG. 1, the interior of a portable heating chamber system, according to one embodiment of the present invention 10, contains two electrical resistive heat sources 11. An air circulating means is provided in the form of an electric fan 12.

Figure 2:
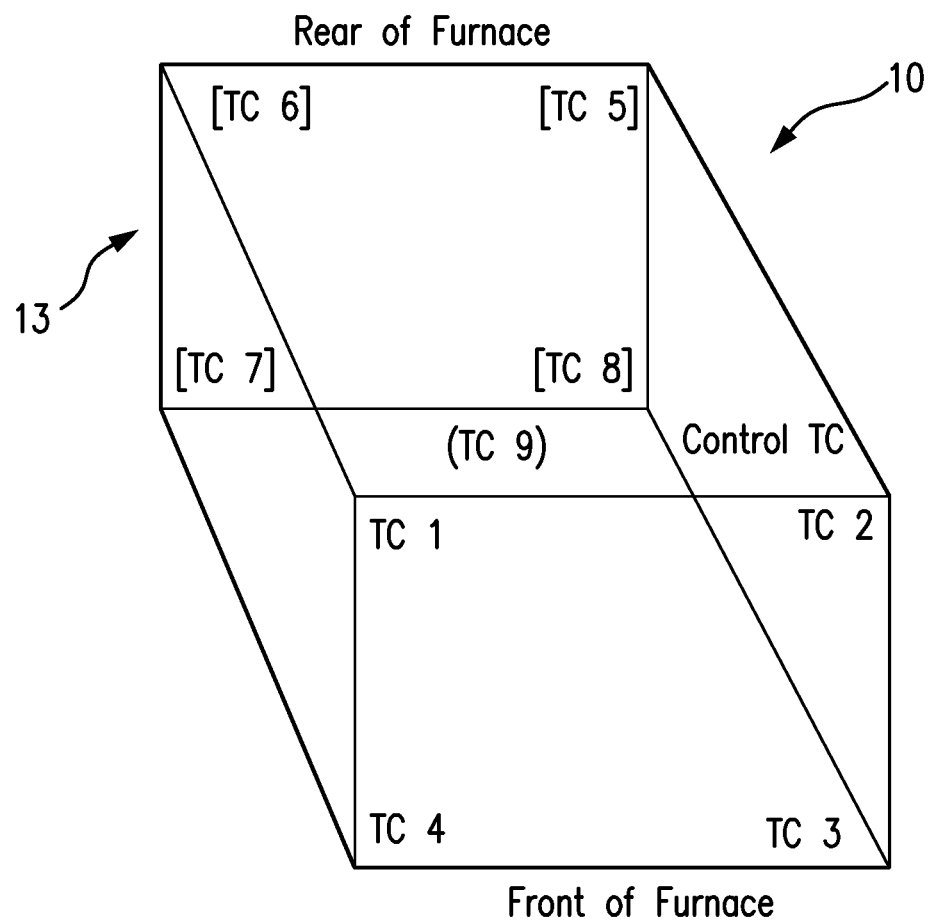
FIG. 2 is a schematic diagram of an array of test thermocouples with a control thermocouple according to one embodiment of the present invention.

An array of test thermocouples 13 is distributed within the interior of the chamber, as depicted schematically in FIG. 2. Of nine test thermocouples, eight, designated TC1-TC8, are located in the corners of the chamber, with one test thermocouple, designated TC9, centrally located in the chamber. A temperature control thermocouple, designated "Control TC," is positioned along a side wall of the chamber.

Figure 3:
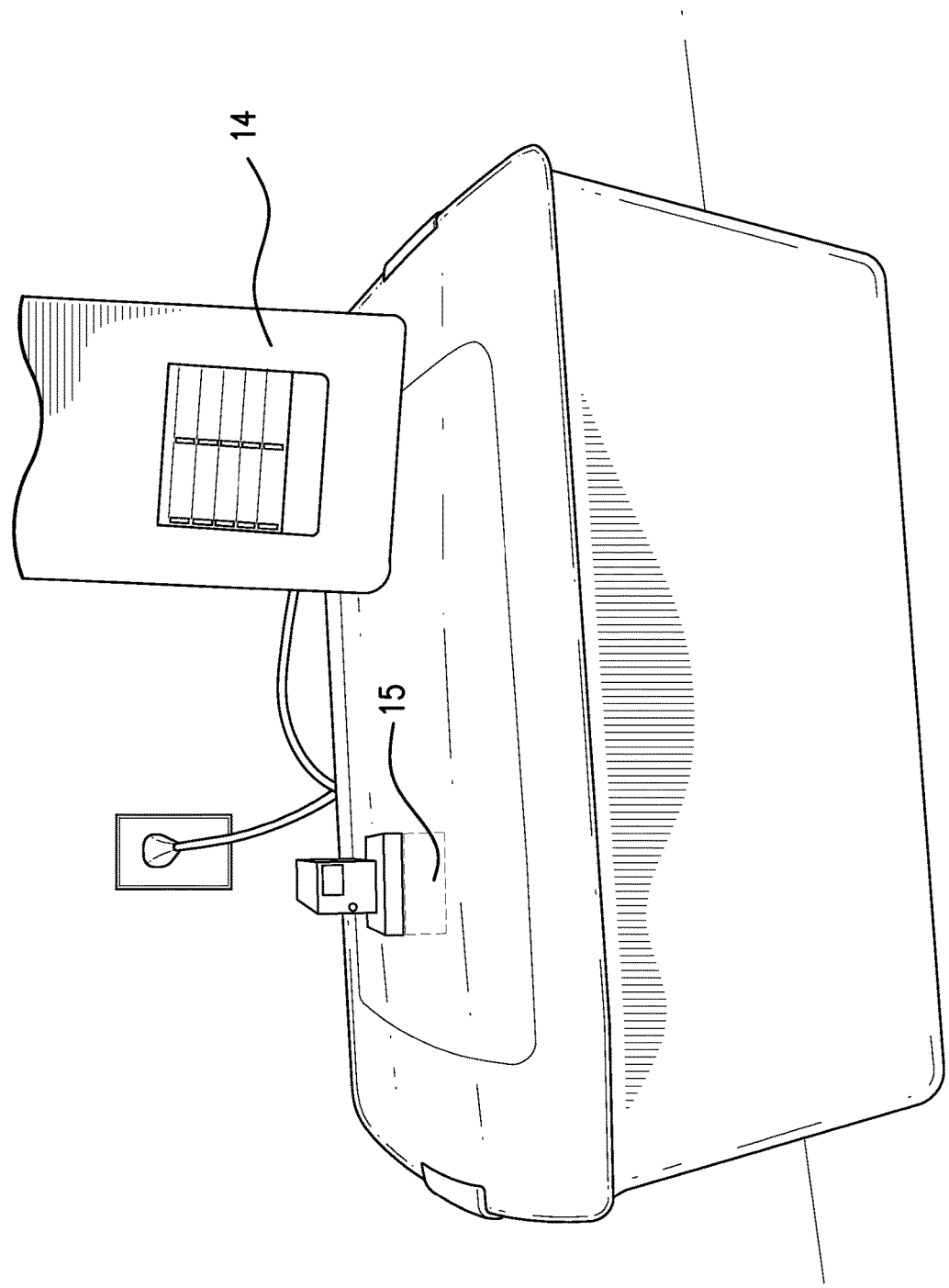
FIG. 3 is a side perspective view of the exterior of a portable heating chamber system according to one embodiment of the present invention.
Figure 4:
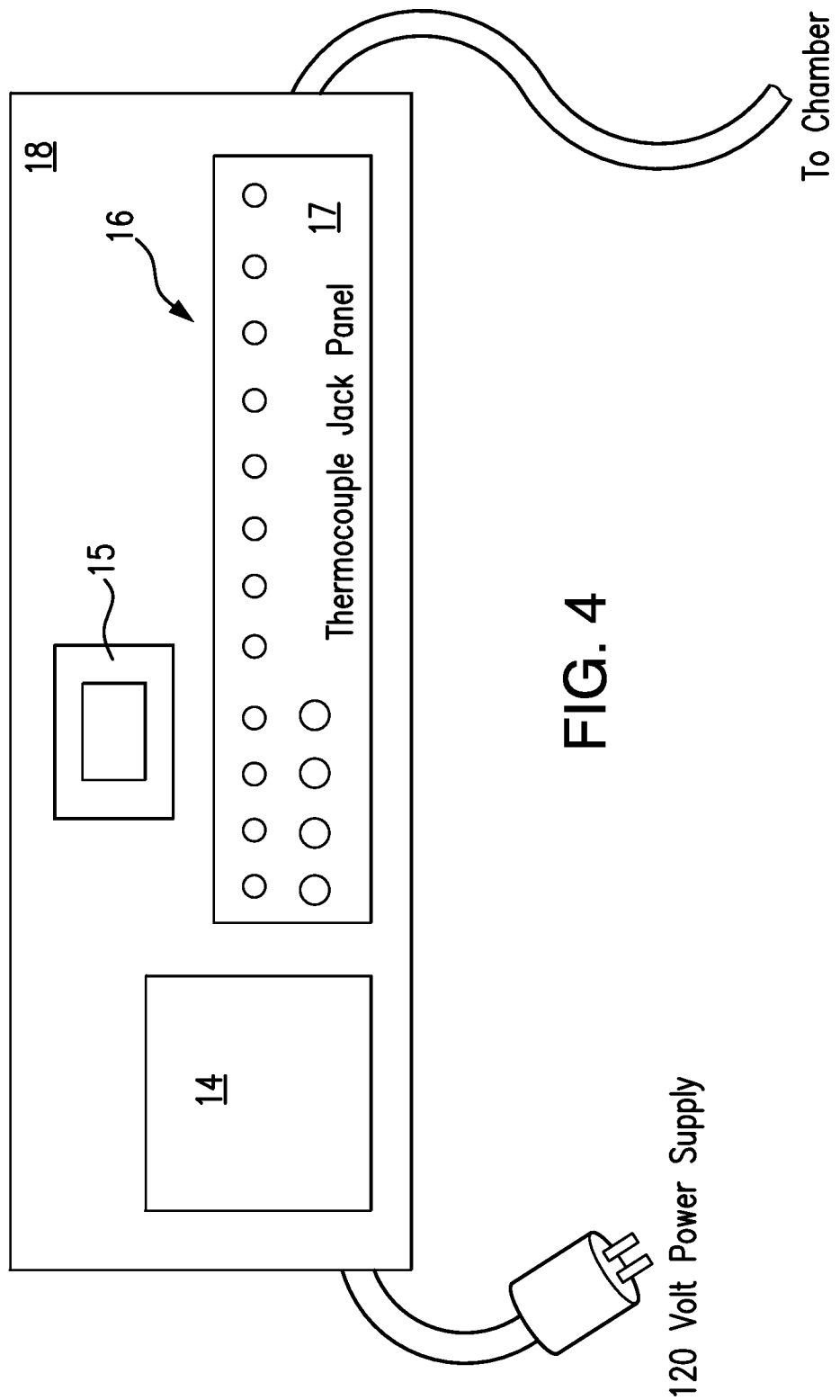
FIG. 4 is a schematic diagram of the exterior components of a portable heating chamber system according to one embodiment of the present invention.

Referring to FIGS. 3 and 4, the exterior components of the system include a temperature controller 14, which is wired to the electric heaters 11 through a relay 15. The temperature controller 14 cycles the heaters 11 on and off, based on temperature readings received from the control thermocouple, so as to maintain a constant and uniform control temperature.

Lead wires from the test thermocouples 13 are connected to input channels 16 through a jack panel 17 in a data acquisition device 18. The data acquisition device records temperature readings from the test thermocouples 13 at one-minute intervals for a minimum of two hours. Calibration-based correction factors for the test thermocouples 13 and input channels 16 are applied to the temperature readings, and a high-low corrected temperature range is used to determine an uncertainty for each test thermocouple. Such uncertainties are compared with standard criteria to determine testing proficiency.

Although the preferred embodiment of the present invention has been disclosed for illustrative purposes, those skilled in the art will appreciate that many additions, modifications and substitutions are possible, without departing from the scope and spirit of the present invention as defined by the accompanying claims.

What is claimed is:

1. A portable heating chamber system for pyrometric proficiency testing, comprising:
    an enclosing structure defining an interior zone and an exterior zone;
    within the interior zone, one or more air circulating means and one or more heat sources;
    a data acquisition device located in the exterior zone;
    multiple temperature sensors uniformly distributed within the interior zone, wherein each temperature sensor transmits sensor temperature data to the data acquisition device through a wired or wireless connection;
    a control sensor located at or near the center of the interior zone;
    in the exterior zone, a temperature controller which receives control temperature data from the control sensor and responds to the control temperature data by transmitting temperature control signals to the heat sources through one or more wired or wireless connections;
    wherein the temperature control signals are adapted and configured to achieve and maintain a constant and uniform control temperature in the interior zone;
    wherein the data acquisition device is adapted and configured to receive and record the sensor temperature data from each temperature sensor at regular intervals for a set test duration and to record a high and low temperature for each temperature sensor for the test duration;
    wherein the data acquisition device has multiple input channels, each of which is adapted and configured to receive the sensor temperature data from one of the temperature sensors; and
    wherein associated with each of the temperature sensors is a sensor correction factor, and wherein associated with each of the input channels is a channel correction factor.

2. The portable heating chamber system of claim 1, wherein the data acquisition device is adapted and configured to apply the corresponding sensor correction factor and the corresponding channel correction factor to the sensor temperature data from each temperature sensor so as to calculate and record corrected sensor temperatures.

3. The portable heating chamber system of claim 2, further comprising, in the exterior zone, a computing device in wired or wireless communication with the data acquisition device, wherein the computing device is adapted, configured and programmed to receive the corrected sensor temperatures from the data acquisition device and to compile the corrected sensor temperatures in a proficiency test spreadsheet.

4. The portable heating chamber system of claim 3, wherein the computing device is adapted, configured and programmed to compare the corrected sensor temperatures with the control temperature and to thereby calculate a temperature uncertainty associated with testing proficiency.

* * * * *